Nov. 9, 1926.

A. H. WYATT 1,606,014

INDICATOR FOR POWER TRANSMISSION DEVICES

Filed Sept. 10, 1921   2 Sheets-Sheet 1

Arthur H. Wyatt
INVENTOR.

BY

Charles E. Wray
ATTORNEY.

Nov. 9, 1926.  1,606,014
A. H. WYATT
INDICATOR FOR POWER TRANSMISSION DEVICES
Filed Sept. 10, 1921    2 Sheets-Sheet 2
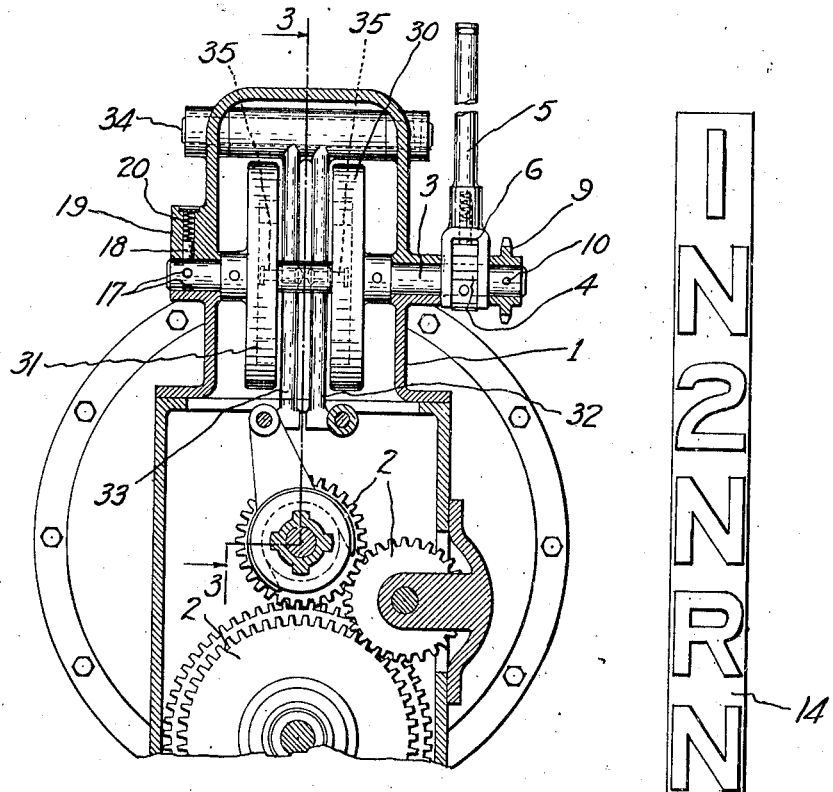
Fig. 2
Fig. 4.
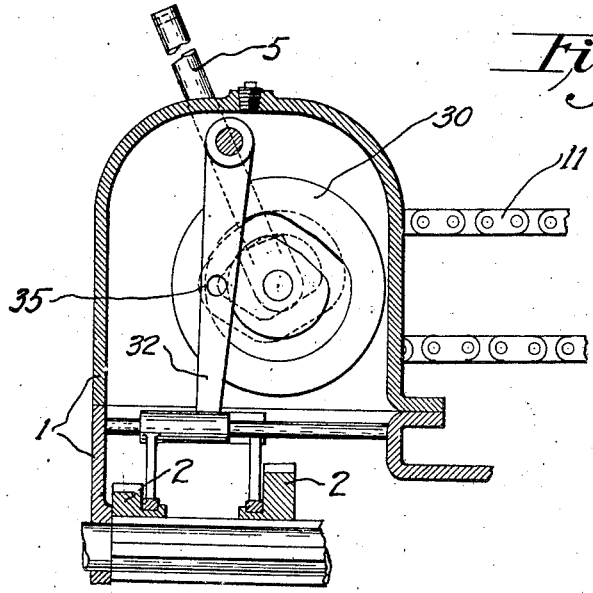
Fig. 3.
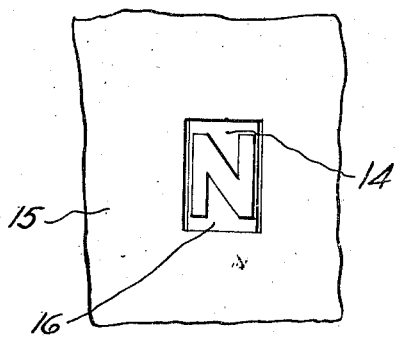
Fig. 5
Arthur H. Wyatt
INVENTOR.
BY
ATTORNEY.

Patented Nov. 9, 1926.

1,606,014

UNITED STATES PATENT OFFICE.

ARTHUR H. WYATT, OF TOLEDO, OHIO, ASSIGNOR TO THE AUTOMOTIVE CORPORATION, OF TOLEDO, OHIO, A CORPORATION OF DELAWARE.

INDICATOR FOR POWER-TRANSMISSION DEVICES.

Application filed September 10, 1921. Serial No. 499,803.

This invention relates to indicators for power transmission devices and the object of the invention is to provide a means to indicate to the operator the setting of the gears within the transmission. In operating farm machinery the tractor is usually attached to farm implements to draw the same and it is generally necessary to provide an operator for the tractor and an operator for the farm implement. The purpose of this invention is to provide a construction whereby one operator may ride on the farm implement and control both the tractor and the farm implement from one position thereby reducing the cost of labor, the construction involving a means to inform the operator at all times of the setting of the gears within the transmission. For this purpose the indicator is provided adjacent the rear end of the tractor and is exposed to the view of the operator through an aperture provided therefor, the characters on the indicator indicating the relationship of the gears in the transmission. A further object of the invention is to provide an indicator for a power transmission device having characters thereon corresponding with the different gear changes, the indicator operating in conjunction with the gear shift lever to expose a character corresponding with the gear change to the view of the operator. In the following specification I have described a transmission mechanism which may be utilized in any of the various places where a speed changing power transmission is desired and which is operable by a lever and ratchet mechanism wherein a shaft may be turned intermittently, the construction being such that upon the shaft being turned to a certain position a gear is shifted and a certain speed of operation of the driven shaft may be secured and by again turning the shaft through the operation of the lever and ratchet mechanism the said gear first connected is disconnected and a second gear moved sequentially to operative relation with the driven shaft or the first named gear may be moved to operative relation with the several speed changing gears, but it is to be understood that this indicating device is adaptable for use with any transmission mechanism, it being necessary to provide characters on the indicator wheel to correspond with the gear changes of the particular transmission mechanism with which it is used. These objects and the several novel features of the invention are hereinafter more particularly described and claimed and the preferred form of construction by which these objects are attained is shown in the accompanying drawings in which—

Fig. 2 is a section through the transmission showing the means for operating the same.

Fig. 3 is a section taken on line 3—3 of Fig. 2.

Fig. 4 is a development of the rim of the indicator wheel.

Fig. 5 is a view of one of the indications on the indicator wheel as it appears to the driver.

Figure 1:
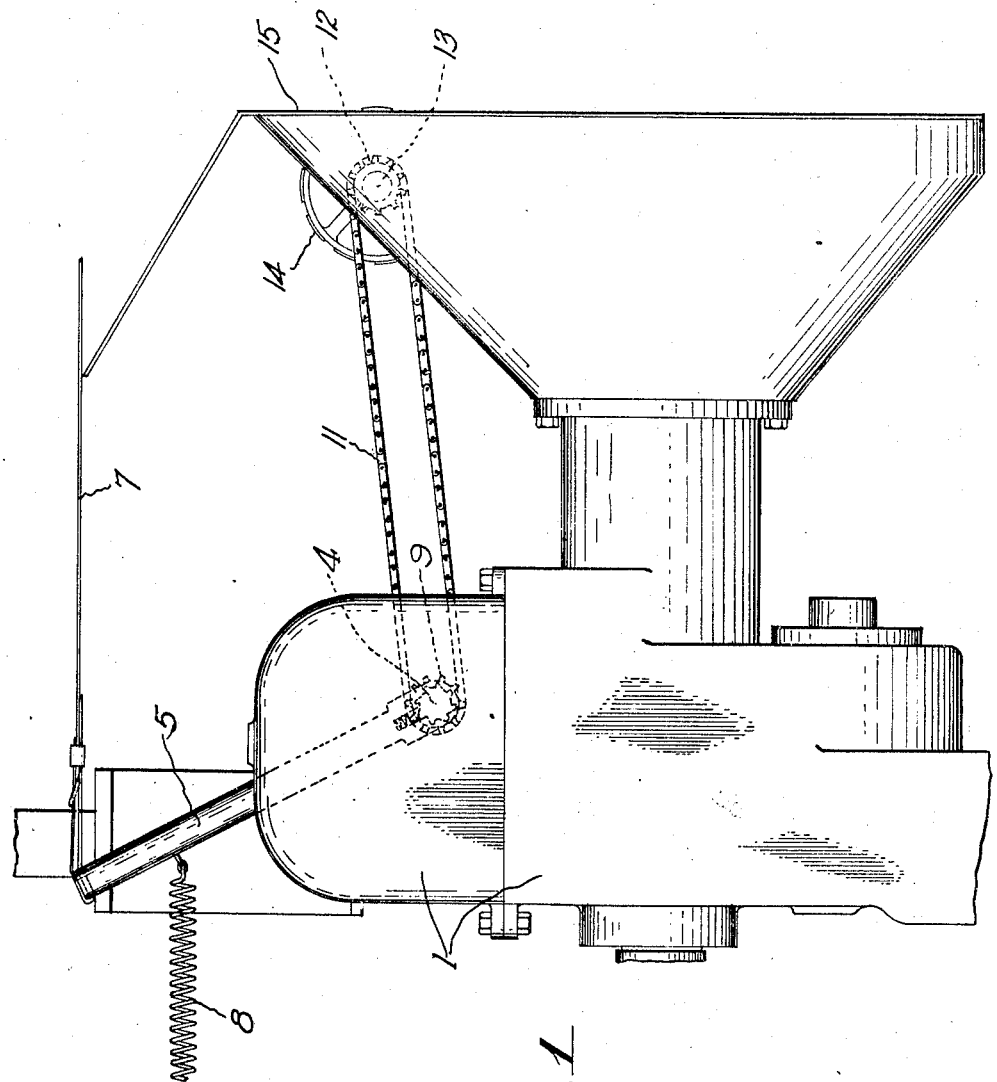
Fig. 1 is a side view of the rear end of a tractor upon which my device is mounted.

As shown in Fig. 2, a transmission casing 1 is provided enclosing gears 2 and rotatably mounted in this casing 1 is a shaft 3 on which is secured a pair of cams 30 and 31 having cam grooves therein as shown in full and dotted lines in Fig. 3. A pair of levers 32 and 33 are pivotally mounted on the shaft 34 and are each provided with a pin 35 riding in one of the cam grooves, as shown in dotted lines in Fig. 2. At the lower end each of these levers in connected to a yoke adapted upon movement of the levers to shift a gear into or out of mesh with other gears in the transmission to vary the speed of rotation of a driven element. It can thus be seen that by intermittent rotation of the shaft 3 the cams are intermittently moved thus moving the levers to produce the different gear changes. This shaft 3 is rotatably mounted in bearings therefor in the casing 1 and is provided with a ratchet 4 which is secured to the shaft 3. Rotatably mounted on this shaft 3 is a lever 5 and this lever 5 is provided with a spring pressed dog 6 engaging in the teeth of the ratchet 4. As shown in Fig. 1 connected to this lever 5 is a drive line or cable 7 which extends to the rear of the tractor and which is adapted to be held by the driver on a vehicle drawn by the tractor. To hold the lever 5 in the position shown I provide a coil spring 8 which extends from the lever 5 and is secured at the opposite end to any suitable portion of the tractor the object being to place a tension on the spring in order to yieldably hold the lever 5 in the proper position. As shown in Fig. 2, a sprocket 9 is secured to the end of the shaft 3 by the pin 10 and engaging the teeth of the sprocket 9 is a chain 11 which extends forward and about a sprocket 12 secured to the shaft 13 of the indicator wheel 14 which is shown in dotted lines in Fig. 1. A development of the rim of the indicator wheel is shown in Fig. 4 showing the characters appearing on the face thereof, 1 indicating first speed, 2 second speed, R reverse, and N neutral. This indicator wheel 14, as will be seen from Fig. 1, is secured on the shaft 13 of the sprocket 12 and the plate 15 at the rear end of the tractor is provided with an opening 16 therein through which the characters on the wheel 14 may be seen one at a time, as shown in Fig. 5, by the driver who is generally seated on the vehicle drawn by the tractor. By this arrangement the driver is continuously informed of the position of the gears within the transmission and may make the necessary gear changes by successive pulls on the line 7.

In operation the lever 5 is to be first considered as being in the position shown in Figs. 1 and 3 and, for the purpose of illustration, we will consider the gears to be in the neutral position at which time the letter N appears in the opening 16 as shown in Fig. 5. To start the tractor the operator pulls on the line 7 which moves the lever 5 through an arc of approximately 60 degrees which moves the ratchet 4, shaft 3 and cams 30 and 31 also approximately 60 degrees. This movement sets the transmission gears at first speed and rotates the wheel 14 by means of the chain 11 thus positioning the numeral 1 beneath the opening 16. Upon releasing the drive line 7 the spring 8 returns the lever 5 to the position shown in Fig. 1 the dog 6 moving backward over the teeth of the ratchet 4. To prevent reverse rotation of the shaft 3 by the return movement of the lever 5 I provide a series of recesses 17 in the face of the shaft 3 and a pin 18 is provided fitting in an aperture in the part 19 of the casing and being yieldably pressed into one of the recesses 17 by tension of the spring 20 by which means the shaft 3 is yieldably held from rotation by return movement of the lever 5. Upon a succeeding pull on the line 7 the gears are again moved to the neutral position at which time another pull on the line 7 sets the gears in reverse and upon succeeding pulls on the line 7 the gears are moved again to neutral and then to second or high speed. By this construction it will be noted that the shaft 3 is rotated in one direction only and upon each intermittent movement of the shaft 3 the relationship of the transmission gears is changed.

From the foregoing description it becomes evident that the device is very simple and efficient in operation, will not easily get out of order and provides a transmission in which an indication of the setting of the gears is always exposed to view, and which accomplishes the objects desired.

Having thus fully described my invention, its utility and mode of operation, what I claim and desire to secure by Letters Patent of the United States is—

1. An indicator comprising the combination with a power transmission device including a plurality of gears and gears to be shifted into and out of mesh therewith to vary the speed of a driven element, of an indicator wheel having indications on the face thereof corresponding to the different gear changes, a shifting device for the shiftable gears, means whereby, on the shifting any one of the said gears into mesh with another, the indicator is caused to visibly indicate the particular gear shifted.

2. An indicator comprising the combination with a power transmission device including a plurality of gears and of other gears to be shifted into and out of mesh therewith to vary the speed of a driven element, of an indicator bearing indications corresponding to the various possible gear changes, a housing therefore arranged to permit a single indication at a time to be exposed to view, a shifting device for the shiftable gears, and means connected with the shiftable device adapted to operate the indicator, the said indicator and gear shift device being in such mechanical relation that the actuation of the shift device a particular gear causes the indicator to indicate the gear shifted at the completion of the shifting operation.

3. The combination with a power transmission device including a gear adapted to be shifted into and out of mesh with speed changing gears, of an indicator wheel rotatably mounted at a distance from the transmission device and having indications thereon to indicate whether the gears are in or out of mesh, means for shifting the gear, the arrangement being such that only a single indication of the indicator wheel is exposed to view at a time, means whereby shifting of the gear into mesh with either speed changing gear or to neutral position causes the indicator wheel to indicate the position of the shiftable gear.

4. In an indicator for power transmission devices including gears adapted to be shifted to produce changes in speed of a driven element, a shaft, a lever adapted to intermittently rotate the shaft in one direction only to shift the said gears, an indicator wheel at a distance from the shaft having a series of characters thereon corresponding with the different gear changes, means whereby only one of the characters may be exposed to view at a time, and means for intermittently moving the indicator wheel upon each intermittent movement of the said shaft.

5. In an indicator for power transmission devices including gears adapted to be shifted to produce changes in speed of a driven element, a casing for the transmission, a shaft rotatably mounted therein, a pair of cams on the said shaft adapted upon intermittent rotation thereof to shift the various gears, a ratchet on the said shaft, a lever having a dog engaging the said ratchet whereby the shaft may be intermittently rotated, a sprocket on the said shaft, an indicator wheel rotatably mounted at a distance from the said shaft, a sprocket secured to the indicator wheel, a chain connecting the sprockets of the shaft and indicator wheel, the indicator wheel being provided with a series of characters on the periphery thereof corresponding to the different gear changes, and means whereby only one of the characters thereon may be exposed to view at a time.

6. In an indicator for power transmission devices including gears adapted to be shifted to produce changes in speed of a driven element, an intermittently rotatable shaft, a cam on the said shaft adapted upon intermittent rotation thereof to shift a gear into or out of mesh with companion gears provided therefor, a lever adapted to intermittently rotate the shaft upon intermittent movement thereof in one direction only, an indicator wheel rotatably mounted at a distance from the said shaft, means whereby each intermittent rotation of the said shaft is communicated to the indicator wheel, the indicator wheel being provided with a series of characters on the outer periphery thereof corresponding to the different gear changes, and means whereby only one of the characters thereon may be exposed to view at a time.

7. In an indicator for speed changing power transmission devices for automotive vehicles, the combination with the transmission and operative mechanism therefor, of a casing or housing for the transmission and connected parts, a lever for causing the variations in speed of operation, an indicator having characters indicative of the various possible speed changes, an aperture in the casing adjacent which the indicator is mounted and through which a single indication is exposed to view at a time, means for operating the transmission mechanism to produce the various speed changes, and means connected therewith for actuating the indicator device to indicate the changes made.

In testimony whereof, I sign this specification.

ARTHUR H. WYATT.